United States Patent
Oh et al.

(10) Patent No.: US 11,381,498 B1
(45) Date of Patent: Jul. 5, 2022

(54) SYSTEM FOR TRANSMITTING BROADCAST DATA

(71) Applicant: DIGICAP CO., LTD., Seoul (KR)

(72) Inventors: Sungheun Oh, Seoul (KR); Kitaek Lee, Goyang-si (KR); Myungho Lee, Seoul (KR); Joon Young Park, Seoul (KR)

(73) Assignee: DIGICAP CO., LTD., Seoul (KR)

( * ) Notice: Subject to any disclaimer, the term of this patent is extended or adjusted under 35 U.S.C. 154(b) by 74 days.

(21) Appl. No.: 17/139,110

(22) Filed: Dec. 31, 2020

(51) Int. Cl.
| | |
|---|---|
| *H04W 16/14* | (2009.01) |
| *H04L 5/00* | (2006.01) |
| *H04N 21/643* | (2011.01) |
| *H04L 45/24* | (2022.01) |
| *H04H 20/71* | (2008.01) |

(52) U.S. Cl.
CPC ............. *H04L 45/24* (2013.01); *H04H 20/71* (2013.01)

(58) Field of Classification Search
CPC ................................. H04L 45/24; H04H 20/71
See application file for complete search history.

(56) References Cited

U.S. PATENT DOCUMENTS

2016/0073176 A1 * 3/2016 Phillips ................... H04L 47/15 725/35
2020/0288325 A1 * 9/2020 Simon ................... H04W 16/14

FOREIGN PATENT DOCUMENTS

| KR | 10-2013-0127990 A | 11/2013 |
| KR | 10-2016-0048157 A | 5/2016 |
| KR | 10-2016-0052447 A | 5/2016 |

OTHER PUBLICATIONS

Korean office action dated Apr. 27, 2022 for Korean Application No. 10-2021-0030390.

* cited by examiner

*Primary Examiner* — Derrick V Rose
(74) *Attorney, Agent, or Firm* — Insight Law Group, PLLC; Seung Lee (57) ABSTRACT

A broadcast transmission system according to an aspect of the present invention includes a broadcast network controller and a broadcast network switch, thereby transmitting an Internet protocol (IP) stream for a service that cannot be transmitted through one physical layer pipe (PLP) by distributing the IP stream into a combination of one or more PLPs. In this case, the combined PLPs may be in one or more broadcast network frequency bands. The broadcast network controller determines the combination of PLPs, and the broadcast network switch distributes the IP stream into one or more PLPs according to a control command of the broadcast network controller.

10 Claims, 4 Drawing Sheets

| SCHEDULER | PLP | MAXIMUM TRANSMISSION BANDWIDTH(Mbps) | BANDWIDTH CURRENTLY IN USE(Mbps) | RESIDUAL BANDWIDTH (Mbps) |
|---|---|---|---|---|
| SCHEDULER A (10Mbps) | PLP:A1 | 6 | 5.8 | 0.2 |
| | PLP:A2 | 4 | 3 | 1 |
| SCHEDULER B (10Mbps) | PLP:B1 | 4 | 3 | 1 |
| | PLP:B2 | 4 | 4 | 0 |
| | PLP:B3 | 2 | 1.9 | 0.1 |

```
1  <flow>
2      <flow-name>NSH_split</flow-name>
3      <id>245</id>
4      <table_id>1</table_id>
5      <priority>2</priority>
6      <match>
7          <in-port>5</in-port>
8          <ipv4-source>19.1.2.3/10</ipv4-source>
9          <ipv4-destination>239.0.0.0/22</ipv4-destination>
10         <ip-match>
11             <ip-protocol>17</ip-protocol>
12         </ip-match>
13         <udp-source-port>2534</udp-source-port>
14         <udp-destination-port>5001</udp-destination-port>
15         <otp-payload>81</otp-payload>
16         <dstp-ipv4-dest>224.224.1.1/34</dstp-ipv4-dest>
17         <dsty-group>1</dsty-group>
18         <dstp-type>14</dstp-type>
19     </match>
20     <instruction>
21     <instruction>
22         <order>0</order>
23         <apply-action>
24             <action>
25                 <order>1</order>
26                 <traffic-cir>100000</traffic-cir>
27             </action>
28     <action>
29                 <order>2</order>
30                 <split>
31                     <rs-ipv4-source>19.1.2.3/10</rs-ipv4-source>
32                     <rs-udp-source-port>5001</rs-udp-source-port>
33                     <rs-is-tcl>10</rs-is-tcl>
34                     <split-flow>
35                         <split-flow-id>1</split-flow-id>
36                         <split-percentage>40</split-percentage>
37                         <rs-ipv4-destination>239.0.0.1/22</rs-ipv4-destination>
38                         <rs-udp-destination-port>6001</rs-udp-destination-port>
39                         <output-node-connector>1</output-node-connector>
40                     </split-flow>
41                     <split-flow>
42                         <split-flow-id>2</split-flow-id>
43                         <split-percentage>42</split-percentage>
44                         <rs-ipv4-destination>239.0.0.2/22</rs-ipv4-destination>
45                         <rs-udp-destination-port>6002</rs-udp-destination-port>
46                         <output-node-connector>2</output-node-connector>
47                     </split-flow>
48                 </split>
49             </action>
50         </apply-action>
51     </instruction>
52     </instructions>
53 </flow>
```

SYSTEM FOR TRANSMITTING BROADCAST DATA

TECHNICAL FIELD

The present invention relates to a broadcast transmission system, and more particularly, to a system that transmits one or more real-time services and non-real-time services in one broadcast network frequency bandwidth on the basis of A11 IP.

BACKGROUND ART

A broadcast company, which owns a broadcast network frequency, aims to efficiently transmit non-real-time data by maximally using the remaining bandwidth other than the broadcast network bandwidth for transmitting conventional real-time services (e.g., video services). Examples of non-real-time data services include Internet of Things (IoT) firmware updates, push video on demand (VOD) services, etc.

Like the Advanced Television Systems Committee (ATSC) 3.0 standard led and established by North America, an A11-IP-based broadcast service system transmits IP streams in one or more broadcast frequency bandwidths (e.g. 6 MHz bandwidth), and a real-time service and a non-real-time data service are structured using IP streams and transmitted.

Figure 1:
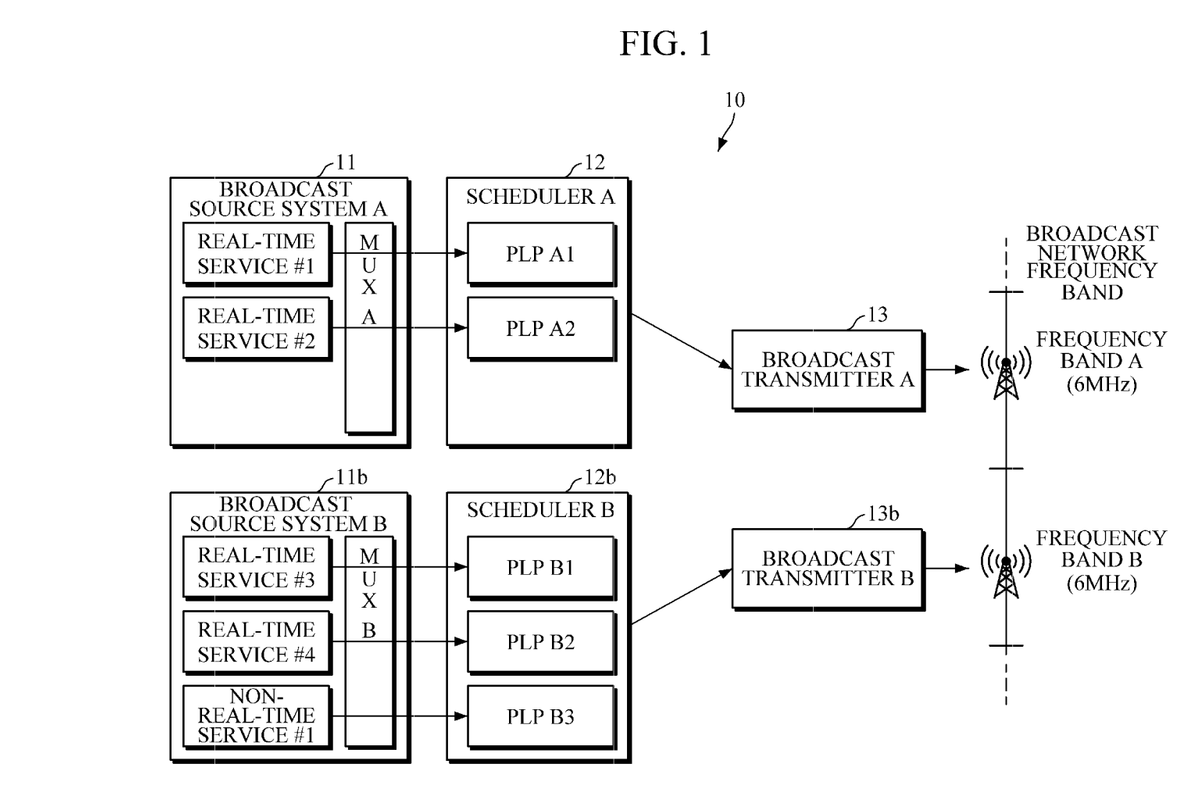
FIG. 1 shows a configuration of a broadcast transmission system according to a conventional technique.

As shown in FIG. 1, a conventional broadcast transmission system consists of a broadcast source system, a scheduler, and a broadcast transmitter for each broadcast network frequency band, and the scheduler structures one broadcast frequency bandwidth (e.g., 6 MHz bandwidth) into one or more physical layer pipes (PLPs).

For example, a scheduler "A" capable of 10 Mbps transmission is structured with PLPs A1 and A2, and the maximum transmission bandwidth may be set to 6 Mbps for PLP A1 and 4 Mbps for PLP A2. Also, a scheduler "B" capable of 10 Mbps is structured with PLPs B1, B2, and B3, and the maximum transmission bandwidth may be set to 4 Mbps for PLP B1, 4 Mbps for PLP B2, and 2 Mbps for PLP B3. In this case, when it is assumed that PLP A1 has a residual bandwidth of 0.2 Mbps, PLP A2 has a residual bandwidth of 1 Mbps, PLP B1 has a residual bandwidth of 1 Mbps, PLP B2 has a residual bandwidth of 0 Mbps, and PLP B3 has a residual bandwidth of 0.1 Mbps, a new service that requires a transmission bandwidth of 2 Mbps cannot be added because there is no PLP with a residual bandwidth capable of carrying the service even though the two broadcast network frequency bands have a total residual bandwidth of 2.3 Mbps. Therefore, there is a need for an efficient transmission method that enables such an addition.

DISCLOSURE

Technical Problem

The present invention is directed to providing a broadcast transmission system capable of transmitting an Internet protocol (IP) stream of an added service using two or more physical layer pipes (PLPs) of one or more broadcast network frequency band in a distributed fashion when the IP stream cannot be transmitted using one PLP in one broadcast network frequency band.

Technical Solution

A broadcast transmission system according to one aspect of the present invention includes a broadcast source system, a scheduler, and a broadcast transmitter and further includes a broadcast network switch and a broadcast network controller.

The broadcast source system packetizes one or more real-time broadcast services and non-real-time data services to output an IP stream, the scheduler transmits an input IP stream through one or more physical layer pipes (PLPs), and the broadcast transmitter transmits a broadcast signal corresponding to one broadcast radio frequency bandwidth.

The broadcast network switch delivers IP streams input from broadcast source systems of a plurality of broadcast transmission systems to a designated scheduler.

The broadcast network controller collects PLP information managed by schedulers of the plurality of broadcast transmission systems, determines an IP stream transmission method, and delivers a control command for the determined transmission method to the scheduler and the broadcast network switch.

When a new service is added to one broadcast network frequency band, the broadcast network controller determines one or more PLPs to be used to transmit an IP stream of the added service according to bandwidth information of PLPs of the same broadcast network frequency band and then transmits the determination result to the broadcast network switch.

According to another aspect, the broadcast network controller may additionally consider PLPs of other broadcast network frequency bands when determining one or more PLPs to be used to transmit the IP stream of the added service.

According to another aspect, the broadcast network switch may compare the input IP stream to matching information included in the control command for the transmission method, and when the input IP stream matches the matching information, the broadcast network switch may change address information included in the IP stream according to a control command received from the broadcast network controller and may deliver the IP stream to the scheduler.

According to another aspect, the broadcast network switch may compare the input IP stream to matching information included in the control command for the transmission method, and when the input IP stream matches the matching information, the broadcast network switch may change address information included in the IP stream according to a control command received from the broadcast network controller and may deliver the IP stream to a scheduler including the PLP to be used for the transmission.

According to another aspect, when the IP stream is distributed into a PLP of a different broadcast network frequency band according to a distribution command received from the broadcast network controller, the broadcast network switch may generate signaling for the added service and transmit the signaling to a scheduler including the corresponding PLP.

According to another aspect, when the address information included in the IP stream is changed according to the control command, the broadcast network controller may receive signaling for the input IP stream from the broadcast network switch, change address information included in the signaling, and deliver the changed signaling to the broadcast network switch, and the broadcast network controller may generate signaling to be delivered to a scheduler of a different broadcast network frequency band and deliver the signaling to the broadcast network switch.

According to another aspect, the scheduler may transmit PLP information including the maximum transmission bandwidth, a scheduler identifier, and a PLP identifier of a PLP belonging to the scheduler to the broadcast network controller, and PLP information transmitted by the scheduler further may include residual bandwidth information of a PLP.

Advantageous Effects

According to the broadcast transmission system of the present invention, it is possible to transmit an IP stream of an added service using two or more PLPs of one or more broadcast network frequency band in a distributed fashion when the IP stream cannot be transmitted using one PLP in one broadcast network frequency band.

MODES FOR CARRYING OUT THE INVENTION

The above or other aspects will be implemented through embodiments described with reference to the accompanying drawings. It is to be understood that elements in each embodiment can be variously combined with other elements in the corresponding embodiment or elements in the other embodiments unless otherwise stated or as long as there is no contradiction therebetween. In some cases, each block of a block diagram may represent a physical component. In other cases, each block may logically represent a partial function of a single physical component or a common function of a plurality of physical components. Sometimes, actually, a block or a part thereof may be a set of program instructions. Some or all of the blocks may be implemented in hardware, software, or a combination thereof.

Figure 2:
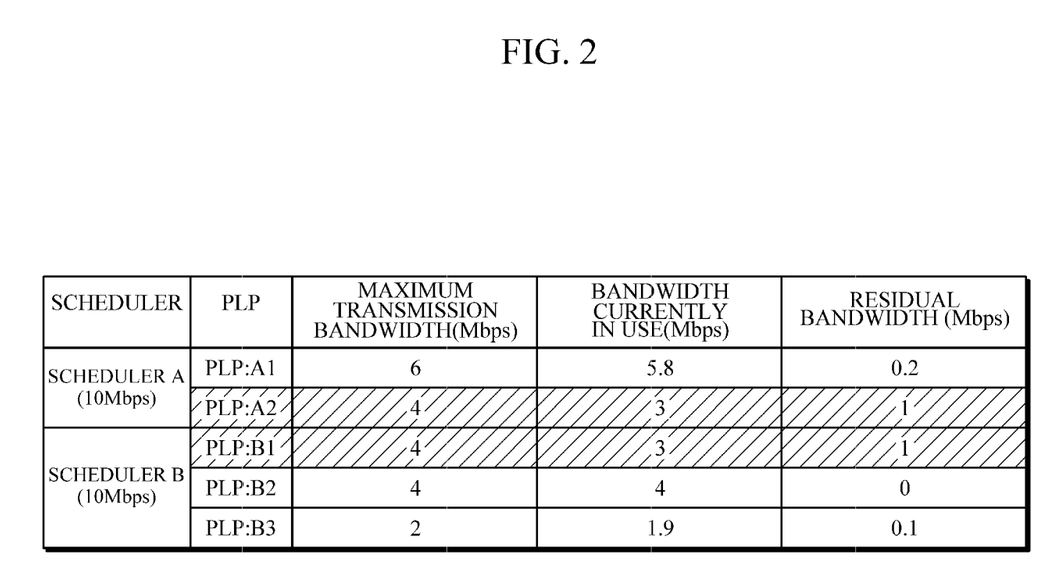
FIG. 2 shows an example of the maximum transmission bandwidth and a residual bandwidth of a physical layer pipe (PLP).

FIG. 1 shows a configuration of a broadcast transmission system according to a conventional technique, and FIG. 2 shows an example of the maximum transmission bandwidth and a residual bandwidth of a physical layer pipe (PLP). As shown in FIG. 1, a broadcast transmission system 10 includes a broadcast source system 11, a scheduler 12, and a broadcast transmitter 13. As shown in FIG. 1, a broadcast transmission system 10 including a broadcast source system "A" 11, a scheduler "A" 12, and a broadcast transmitter "A" 13 transmits IP streams for real-time service #1 and real-time service #2 in a broadcast network frequency band "A" of 6 MHz, and a broadcast transmission system 10 including a broadcast source system "B" 11b, a scheduler "B" 12b, and a broadcast transmitter "B" 13b transmits IP streams for real-time service #3, real-time service #4, and non-real-time data service #1 in a broadcast network frequency band "B" of 6 MHz.

The scheduler "A" 12 is composed of PLP A1 and PLP A2, and the scheduler "B" 12b is composed of PLP B1, PLP B2, and PLP B3. The PLP is a portion of a broadcast radio frequency band with specific modulation (e.g., quadrature phase shift keying (QPSK), 16-quadrature amplitude modulation (QAM), 64-QAM, 256-QAM, etc.) and coding parameters. For example, the PLP may be set with modulation and parameters suitable for a mobile TV reception type or with modulation and parameters suitable for a fixed TV reception type. A real-time service and a non-real-time data service, which are IP streams, are transmitted through each PLP, and signaling information for the IP streams are additionally transmitted. Link layer signaling, which is a link map table (LMT), is delivered to each PLP. The LMT includes <Source IP Address, Destination IP Address, Source Port Number, and Destination Port Number> of all the IP streams delivered through a corresponding PLP and a corresponding PLP identifier.

Signaling information including basic information on the real-time service and the non-real-time data service is additionally transmitted through the corresponding PLP. The signaling information is layered into a Service List Table (SLT) which is one of the types of Low Level Signaling (LLS) and which includes a service list and Service Level Signaling (SLS) which includes detailed information on individual services. The service list in the SLT includes, for each service, a service identifier, a service type (e.g., video service, audio service, disaster alert service data service, app data service, etc.), a service delivery protocol type (e.g., ROUTE, MMT), and <Source IP Address, Destination IP Address, and Destination Port Number) in which the SLS of the corresponding service is delivered. The SLS includes an identifier of a service component (e.g., a video component, an audio component, a closed caption component, an app component, a data component, etc.) included in the corresponding service, a service component type, <Source IP Address, Destination IP Address, and Destination Port Number> in which the IP stream of the component is delivered, etc.

A Real-time Object Delivery over Unidirectional Transport (ROUTE) protocol which is used for non-real-time data service transmission is composed of a ROUTE session and one or more Layered Coding Transport (LCT) sessions included in the ROUTE session. Non-real-time data is structured in a file form and transmitted in a specific LCT session of a specific ROUTE session. Information of <Source IP Address, Destination IP Address, and Destination Port Number> is transmitted through signaling such that the ROUTE session can be recognized by a broadcast receiver. The LCT session is uniquely identified using <Source IP address, Transport Session Identifier (TSI)>. A file delivered through the LCT session is divided into one or more IP packets and then transmitted. IP packets belonging to the same file have a Transmission Object Identifier (TOI) for identifying the file. The TOI has a unique value in the corresponding LCT session.

A service component (e.g., a data component) included in real-time and non-real-time services may be transmitted through one or more ROUTE sessions and a plurality of LCT sessions.

It is assumed that the broadcast transmission system of FIG. 1 is set to the bandwidth shown in FIG. 2 and then used. In this case, when attempting to add new non-real-time data service #2 requiring a transmission bandwidth of 2 Mbps to the broadcast source system A 11, the new non-real-time data service #2 cannot be transmitted because the residual bandwidths of PLP A1 and PLP A2 with which the scheduler "A" 12 is structured are just 0.2 Mbps and 1 Mbps, respectively. As another example, even if the residual bandwidth of PLP A1 is 1 Mbps and the residual bandwidth of PLP A2 is 1 Mbps, the new non-real-time data service #2 cannot be added because the scheduler "A" 12 does not have a PLP with a residual bandwidth capable of accommodating the new non-real-time data service #2 requiring a transmission bandwidth of 2 Mbps.

Figure 3:
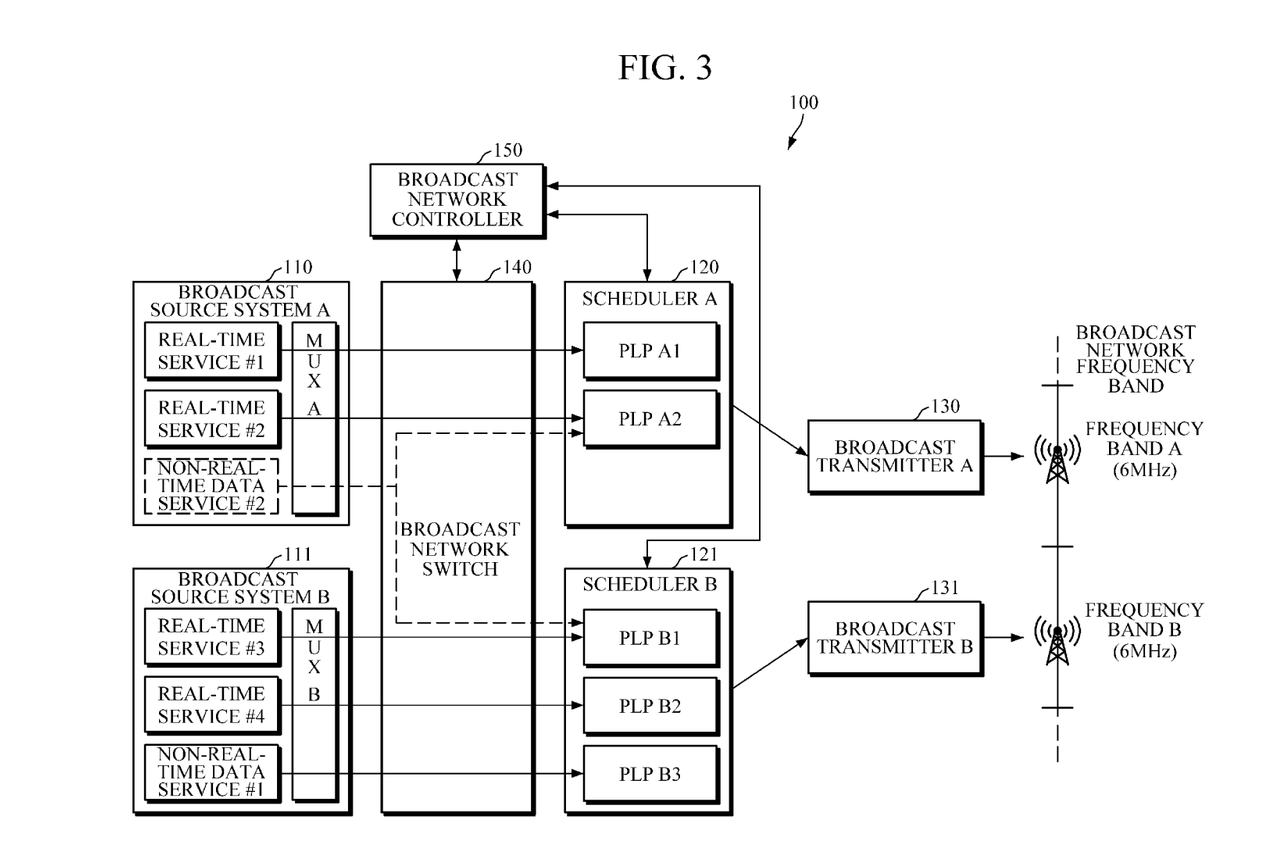
FIG. 3 shows a configuration of a broadcast transmission system according to an embodiment of the present invention.

FIG. 3 shows a configuration of a broadcast transmission system according to an embodiment of the present invention. A broadcast transmission system 100 according to an aspect of the present invention includes a broadcast source system 110, a scheduler 120, and a broadcast transmitter 130 and further includes a broadcast network switch 140 and a broadcast network controller 150.

The broadcast source system 110 transforms one or more real-time broadcast services and non-real-time data services into IP packets, outputs the IP packets in the form of an IP stream, and provides the IP stream to the broadcast network switch 140. Additionally, the broadcast source system 110 provides, to the broadcast network switch 140, basic service information (e.g., a service identifier, a service type, a service transport protocol, etc.) of each provided service and signaling information including <Source IP Address, Destination IP Address, and Destination Port Number> of one or more IP streams in which the corresponding service is transmitted. A specific example of the signaling includes an SLT which is one of the types of Low Level Signaling (LLS) and Service Level Signaling (SLS) which includes detailed information on individual services.

An IP packet of an IP stream output by the broadcast source system 110, that is, an IP stream for delivering a real-time service, a non-real-time service, and signaling includes <Source IP Address, Destination IP Address, Source Port Number, Destination Port Number> in an IP header and a User Datagram Protocol (UDP) header.

According to an aspect of the present invention, the broadcast source system 110 may capsulate and transmit an IP stream including a real-time service, a non-real-time data service, and signaling through a separate tunneling protocol according to an output condition.

The broadcast source system 110 is a system including a video encoder, a closed caption encoder, an ESG server, a signaling server, a scrambler, a multiplexer, etc.

The scheduler 120 forms a broadcast network physical layer structure for one broadcast network frequency bandwidth. The scheduler 120 structures a broadcast network frequency bandwidth of 6 MHz into one or more PLPs. The scheduler 120 is an apparatus that transmits an input IP stream, that is, an IP stream for service and an IP stream for signaling to the broadcast transmitter 130 through one or more PLPs. Typically, the scheduler 120 is installed in a broadcast station studio.

The scheduler 120 delivers an IP stream output from the broadcast network switch 140 to a designated PLP according to a command provided by the broadcast network controller 150.

Also, the scheduler 120 generates an LMT including <Source IP Address, Destination IP Address, Source Port Number, Destination Port Number> of all IP streams delivered through the corresponding PLP in addition to an IP stream for a real-time service and a non-real-time data service and an IP stream for signaling (SLT, SLS, etc.), which are received from the broadcast source system 110, and transmits the LMT over the broadcast network.

The scheduler 120 is aware of the maximum transmission bandwidth in each PLP through the specific settings of parameters. Optionally, the scheduler may be aware of a bandwidth currently in use and a residual bandwidth. The scheduler 120 may deliver PLP information including a PLP identifier of a PLP configured together with its own scheduler identifier and the maximum transmission bandwidth information of the corresponding PLP to the broadcast network controller 150. Additionally, the PLP information transmitted by the scheduler 120 may further include information on a bandwidth currently in use and a residual bandwidth.

The broadcast transmitter 130 transmits a broadcast signal corresponding to one broadcast radio frequency bandwidth.

The broadcast network switch 140 delivers IP streams input from broadcast source systems 110 of a plurality of broadcast transmission systems 100 to a designated scheduler 120 according to a command provided by the broadcast network controller 150.

The broadcast network switch 140 may selectively deliver input signaling information to the broadcast network controller 150. Also, the broadcast network switch 140 may output processed signaling to the scheduler 120.

When a distribution command is included in the command received from the broadcast network controller 150, the broadcast network switch 140 performs a function of distributing an input IP stream into one or more PLPs according to the distribution command depending on the percentages or the bandwidth sizes included in the command. That is, the broadcast network switch 140 compares the input IP stream to matching information included in the control command for the transmission method, and when the IP stream matches the matching information, the broadcast network switch 140 changes the <Source IP Address, Destination IP Address, Source Port Number, Destination Port Number> value of the IP stream according to the control command (distribution command) received from the broadcast network controller 150 and then outputs the IP packet. When a change value for a TSI value is included in the command, the broadcast network switch 140 changes the TSI value of the LCT session of the IP stream and then outputs the IP packet.

Also, when the <Source IP Address, Destination IP Address, Source Port Number, Destination Port Number> value or the TSI value has been changed, the broadcast network switch 140 may modify and output address information included in the signaling included in the input stream and then output the IP packet.

The broadcast network controller 150 collects PLP information managed by the schedulers 120 of the plurality of broadcast transmission systems 100, determines an IP stream transmission method, and delivers a control command for the determined transmission method to the schedulers 120 and the broadcast network switches 140.

The PLP information collected by the broadcast network controller 150 includes a scheduler identifier, a PLP identifier, and the maximum transmission bandwidth of a corresponding PLP. Additionally, the PLP information may further include information on a bandwidth currently in use and a residual bandwidth of the corresponding PLP.

When a new service is added to one broadcast network frequency band, the broadcast network controller 150 determines one or more PLPs to be used to transmit an IP stream of the added service according to bandwidth information of PLPs of the same broadcast network frequency band and then transmits the determination result to the broadcast network switch 140.

The broadcast network controller 150 receives a transmission bandwidth necessary to transmit the IP stream of the service and information on a position to which the corresponding IP stream is to be delivered. The position information may include a combination of one or more of a service identifier or <Source IP address, Destination IP address, Destination Port Number> of the IP packet including the IP stream. Optionally, a Transport Session Identifier (TSI), which is an identifier of the LCT session of the ROUTE protocol, may be additionally included. When the position information includes a service identifier, the broadcast network controller 150 may confirm the corresponding service identifier using signaling information delivered through the input IP stream and then find out <Source IP Address, Destination IP Address, Destination Port Number> of the IP packet of the IP stream belonging to this service.

The broadcast network controller 150 determines whether the transmission of the IP stream is possible through one PLP by determining whether a PLP with a residual bandwidth larger than a transmission bandwidth required for the transmission of the IP stream of the corresponding service is present in the broadcast network frequency band in which the IP stream is to be transmitted. When it is determined that there is no PLP to be used for the transmission, the broadcast network controller 150 determines a combination of PLPs to be used for the transmission. The broadcast network controller 150 combines PLPs of the broadcast network frequency band in which the corresponding IP stream is to be transmitted and determines that the transmission of the IP stream is possible using the combination of PLPs when the sum of the residual network bandwidths of the combined PLPs is greater than or equal to the bandwidth required for the transmission of the IP stream. The residual network bandwidth information of each PLP may be found using residual bandwidth information of each PLP provided by the schedulers 120 or through the difference between information on a network bandwidth through which each PLP performs transmission and the maximum transmission network bandwidth of a corresponding PLP. There may be one or more combinations of PLPs in which the transmission is possible, and a combination of PLPs to be used for the transmission may be determined according to a predetermined criterion. There is no restriction on the selection method for selecting the combination.

The broadcast network controller 150 determines an IP stream transmission method. When it is determined to transmit the input IP stream through the combination of PLPs, the broadcast network controller 150 determines a distribution criterion for how to distribute and transmit the input IP stream to the combination of PLPs. The distribution criterion determined by the broadcast network controller 150 may be a method of specifying a percentage criterion (or transmission bandwidths) for the plurality of PLPs. Referring to an example configuration shown in FIG. 3, the distribution criterion may be a method of specifying to deliver 50% of an IP stream of 100 kbps input to the broadcast network switch 140 to PLP A1 of the scheduler "A" 120 and deliver the remaining 50% to PLP A2 of the scheduler "A" 120 or a method of specifying to deliver an IP stream of 100 kbps input to the broadcast network switch 140 to PLP A1 of the scheduler "A" 120 at 50 kbps and PLP A2 of the scheduler "A" 120 at 50 kbps. As another example, the distribution criterion may be a method of copying an input IP stream and transmitting IP stream copies to all of the plurality of PLPs (e.g., a method of specifying to transmit an IP stream of 100 kbps input to the broadcast network switch 140 to both of PLP A1 of the scheduler "A" 120 and PLP A2 of the scheduler "A" 120).

Also, the broadcast network controller 150 determines a change method of one or more of the TSI value and the <Source IP Address, Destination IP Address, Source Port Number, Destination Port Number> value for the IP packet belonging to the IP stream according to the distribution of the IP stream.

When the broadcast network controller 150 provides the IP packet of the IP stream to selected PLPs of each scheduler, the broadcast network switch 140 determines whether to change one or more of the TSI value and the <Source IP Address, Destination IP Address, Source Port Number, Destination Port Number> value of the corresponding input IP packet. When the broadcast network switch 140 determines to change one or more of the values, the broadcast network controller 150 determines a change value of one or more of the TSI value and the <Source IP Address, Destination IP Address, Source Port Number, Destination Port Number> value to be changed.

The broadcast network controller 150 delivers a control command for the determined IP stream transmission method to the broadcast network switch 140 and the scheduler 120. The broadcast network controller 150 instructs the broadcast network switch 140 to perform the determination method of determining the IP stream by specifying matching information for distinguishing the IP packet of the input IP stream and specifying transmission network bandwidths for the PLPs. Here, the matching information of the IP packet is information obtained by combining one or more of an input network interface identifier, <Source IP information, Destination IP information, Source Port Number, Destination Port Number>, and a protocol identifier (e.g., RTP, DSTP, etc.). The control command (including the transmission method determined by the distribution command) transmitted by the broadcast network controller 150 may be designated as a combination of a PLP identifier and a scheduler identifier or a network interface identifier connected to the scheduler including the PLP to be used for the transmission.

The <Source IP Address, Destination IP Address, Source Port Number, Destination Port Number> to be changed for the IP packet of the input IP stream may be additionally designated, and the control command (the distribution command) for the IP stream transmission method, which is transmitted by the broadcast network controller 150, may be delivered to the broadcast network switch 140.

The broadcast network controller 150 may selectively receive signaling information (e.g., SLT, SLS, etc.) from the broadcast network switch 140. When signaling has to be modified due to the change, distribution, or the like of <Source IP information, Destination IP information, Source Port Number, Destination Port Number> of the IP packet, the broadcast network controller 150 may modify and then transmit the signaling to the broadcast network switch 140 so that the broadcast network switch 140 can output the modified signaling to the scheduler 120.

The broadcast network controller 150 delivers, to the scheduler 120, a control command indicating through which PLP the IP packet of the IP stream output from the broadcast network switch 140 should be transmitted over the broadcast network. The control command includes a mapping list including a PLP identifier for <Source IP Address, Destination IP Address, and Destination Port Number>.

According to another aspect of the present invention, the broadcast network controller 150 may additionally consider PLPs of other broadcast network frequency bands when determining one or more PLPs to be used to transmit the IP stream of an added service.

When the IP stream of a new service cannot be transmitted by a combination of PLPs of the same broadcasting network frequency band, the broadcast network controller 150 may determine one or more PLPs to be used to transmit the IP stream of the added service among PLPs of a plurality of broadcast network frequency bands according to bandwidth information and may transmit the determination result to the broadcast network switch 140.

The broadcast network controller 150 determines a combination of PLPs to be used for the transmission among PLPs of a plurality of broadcast network frequency bands. The broadcast network controller 150 combines PLPs of the plurality of broadcast network frequency bands and determines that the transmission of the IP stream is possible using the combination of PLPs when the sum of the residual network bandwidths of the combined PLPs is greater than or equal to the bandwidth required for the transmission of the IP stream.

The distribution criterion determined by the broadcast network controller 150 may be a method of specifying a percentage criterion (or transmission bandwidths) for the plurality of PLPs. Referring to an example configuration shown in FIG. 3, the distribution criterion may be a method of specifying to deliver 50% of an IP stream of 100 kbps input to the broadcast network switch 140 to PLP A2 of the scheduler "A" 120 and deliver the remaining 50% to PLP B1 of the scheduler "B" 121 or a method of specifying to deliver an IP stream of 100 kbps input to the broadcast network switch 140 to PLP A2 of the scheduler "A" 120 at 50 kbps and PLP B1 of the scheduler "B" 121 at 50 kbps. As another example, the distribution criterion may be a method of copying an input IP stream and transmitting IP stream copies to all of the plurality of PLPs (e.g., a method of specifying to transmit an IP stream of 100 kbps input to the broadcast network switch 140 to both of PLP A2 of the scheduler "A" 120 and PLP B1 of the scheduler "B" 121).

Figure 4:
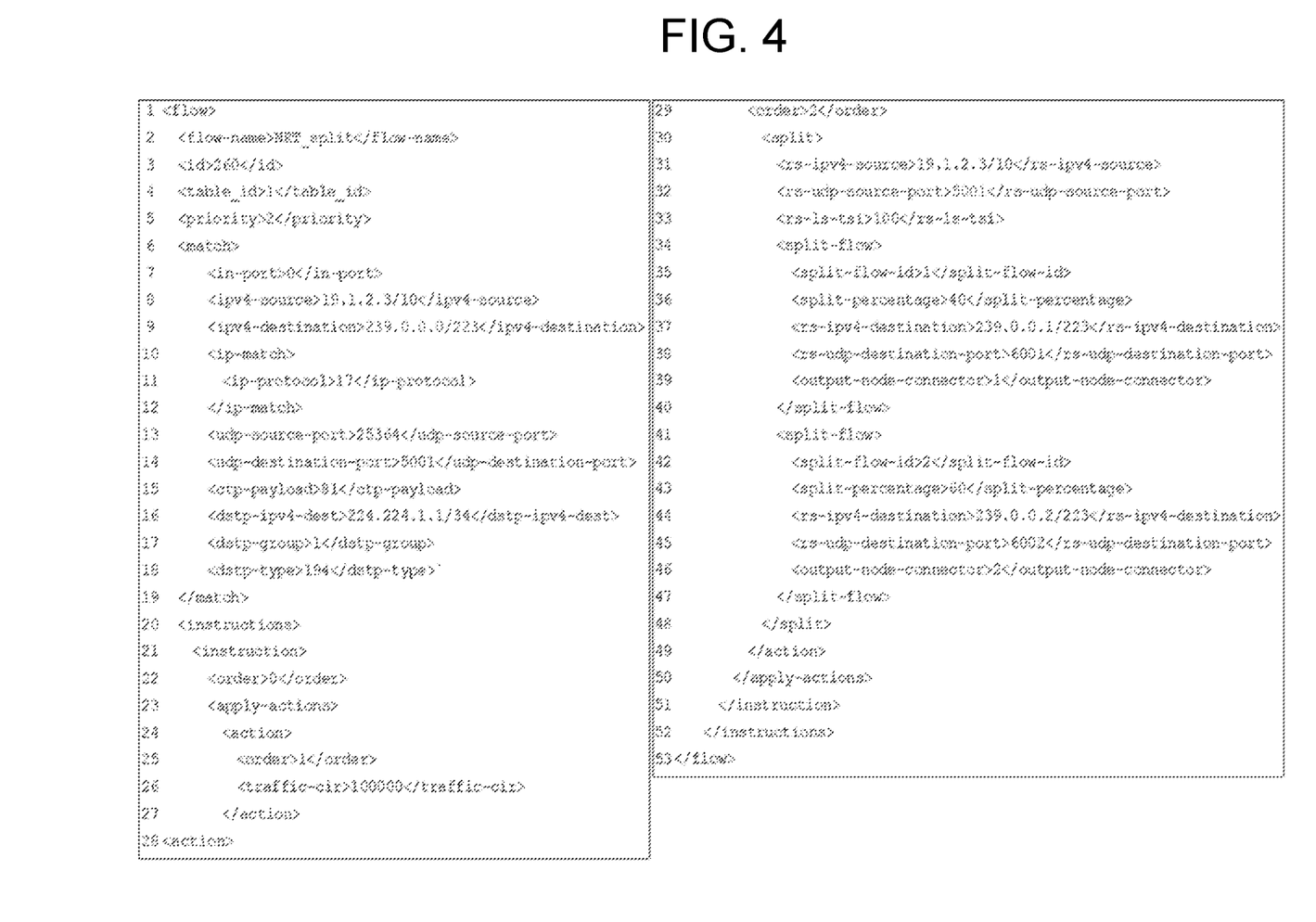
FIG. 4 is an example of a distribution command transmitted by a broadcast network controller.

FIG. 4 is an example of a distribution command transmitted by a broadcast network controller. The distribution command shown in FIG. 4 is expressed in Extensible Markup Language (XML, but the present invention is not limited thereto. In the example shown in FIG. 4, as specified in Match elements in lines 6 to 18, the distribution command instructs that an IP stream including an RTP packet (line 11) delivered to an IP address 19.1.2.3 (line 8), a source port number 25364 (line 13), and a destination port number 5001 (line 14) should maintain a network bandwidth of 100,000 bps when the IP stream is output, that a network bandwidth (line 36) corresponding to 40% of the input IP stream should be output to an output network interface 1 (line 39) wherein the destination IP address of the IP packet is changed to 239.0.0.1 (line 37) and the destination port number is changed to 6001 (line 38), and that a network bandwidth (line 43) corresponding to the remaining 60% of the input IP stream should be output to an output network interface 2 (line 46) wherein the destination IP address of the IP packet is changed to 239.0.0.2 (line 44) and the destination port number is changed to 6002 (line 45).

When the distribution command is included in a command received from the broadcast network controller 150, the broadcast network switch 140 performs a function of distributing an input IP stream into a plurality of PLPs according to the distribution command depending on percentages or bandwidth sizes included in the command. That is, the broadcast network switch 140 compares the input IP stream to matching information included in the control command for the transmission method, and when the IP stream matches the matching information, the broadcast network switch 140 changes the <Source IP Address, Destination IP Address, Source Port Number, Destination Port Number> value of the IP stream according to the control command received from the broadcast network controller 150 and then outputs the IP packet. When a change value of a TSI value is included in the command, the broadcast network switch 140 changes a TSI value of the LCT session of the IP stream and then outputs the IP packet.

Also, when the value <Source IP Address, Destination IP Address, Source Port Number, Destination Port Number> or the TSI value has been changed, the broadcast network switch 140 may modify signaling included in the input stream and then output the IP packet. At this time, when the signaling for the distributed IP stream for the service delivered to a specific PLP according to the distribution command is not included in the input, the broadcast network switch 140 adds the signaling for the distributed new service to the input. For example, since signaling for newly added non-real-time data service #2 is not included in signaling provided by the broadcast source system B 111 in FIG. 3, the broadcast network switch 140 additionally generates and outputs the signaling for the non-real-time data service #2 delivered through PLP B1.

Even when an IP stream is distributed into a plurality of broadcast network frequency bands, the broadcast network controller 150 may selectively receive signaling information (e.g., SLT, SLS, etc.) from the broadcast network switch 140. When signaling has to be modified due to the change, distribution, or the like of <Source IP information, Destination IP information, Source Port Number, Destination Port Number> of the IP packet, the broadcast network controller 150 may modify and then transmit the signaling to the broadcast network switch 140 so that the broadcast network switch 140 can output the modified signaling to the scheduler 120. At this time, when the signaling for the distributed IP stream for the service delivered to a specific PLP according to the distribution command is not included in the input, the broadcast network switch 140 may generate the signaling for the distributed new service and deliver the generated signaling to a scheduler 121 of a different broadcast network frequency band through the broadcast network switch 140.

The present invention has been described above with reference to embodiments referring to the accompanying drawings but is not limited thereto. Rather, the present invention should be construed as encompassing various modifications that may be apparent to those skilled in the art. The appended claims are intended to cover such modifications.

DESCRIPTION OF REFERENCE NUMERALS

100: broadcast transmission system
110: broadcast source system
120: scheduler
130: broadcast transmitter
140: broadcast network switch
150: broadcast network controller

The invention claimed is:

1. A broadcast transmission system that comprises a broadcast source system configured to packetize one or more real-time broadcast services and non-real-time data services to output an Internet protocol (IP) stream, a scheduler configured to transmit an input IP stream through one or more physical layer pipes (PLPs), and a broadcast transmitter configured to transmit a broadcast signal corresponding to one broadcast radio frequency bandwidth, the broadcast source system further comprising:

a broadcast network switch configured to deliver IP streams input from broadcast source systems of a plurality of broadcast transmission systems to a designated scheduler; and a broadcast network controller configured to collect PLP information managed by schedulers of the plurality of broadcast transmission systems, determine an IP stream transmission method, and deliver a control command for the determined transmission method to the scheduler and the broadcast network switch, wherein the broadcast network controller determines one or more PLPs to be used to transmit an IP stream of an added service according to bandwidth information of PLPs of the same broadcast network frequency band and transmits the determination result to the broadcast network switch.

2. The broadcast transmission system of claim 1, wherein when the broadcast network controller determines the one or more PLPs to be used to transmit the IP stream of the added service, the PLPs include PLPs of different broadcast network frequency bands.

3. The broadcast transmission system of claim 1, wherein the broadcast network switch compares the input IP stream to matching information included in the control command for the transmission method, and when the input IP stream matches the matching information, the broadcast network switch changes address information included in the IP stream according to a control command received from the broadcast network controller and delivers the change to the scheduler.

4. The broadcast transmission system of claim 2, wherein the broadcast network switch compares the input IP stream to matching information included in the control command for the transmission method, and when the input IP stream matches the matching information, the broadcast network switch changes address information included in the IP stream according to a control command received from the broadcast network controller and delivers the change to a scheduler including the PLP to be used for the transmission.

5. The broadcast transmission system of claim 3, wherein when the address information included in the IP stream is changed according to the control command, the broadcast network switch changes address information included in signaling for the input IP stream and delivers the change to the scheduler.

6. The broadcast transmission system of claim 3, wherein when the address information included in the IP stream is changed according to the control command, the broadcast network controller receives signaling for the input IP stream from the broadcast network switch, changes address information included in the signaling, and delivers the changed signaling to the broadcast network switch.

7. The broadcast transmission system of claim 4, wherein when the IP stream is distributed into a PLP of a different broadcast network frequency band according to a distribution command received from the broadcast network controller, the broadcast network switch generates signaling for the added service and transmits the signaling to a scheduler including the corresponding PLP.

8. The broadcast transmission system of claim 4, wherein
   when the address information included in the IP stream is changed according to the control command, the broadcast network controller receives signaling for the input IP stream from the broadcast network switch, changes address information included in the signaling, and delivers the changed signaling to the broadcast network switch, and
   the broadcast network controller generates signaling to be delivered to a scheduler of a different broadcast network frequency band and delivers the signaling to the broadcast network switch.

9. The broadcast transmission system of claim 1, wherein the scheduler transmits PLP information including the maximum transmission bandwidth, a scheduler identifier, and a PLP identifier of a PLP belonging to the scheduler to the broadcast network controller.

10. The broadcast transmission system of claim 8, wherein PLP information transmitted by the scheduler further includes residual bandwidth information of a PLP.

* * * * *